United States Patent
Chang

(10) Patent No.: US 7,911,646 B2
(45) Date of Patent: Mar. 22, 2011

(54) MULTILEVEL HALFTONING FOR TINT GRAPHIC, LINE ART AND TEXT RENDERING

(75) Inventor: Ching-Wei Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 579 days.

(21) Appl. No.: 12/023,876

(22) Filed: Jan. 31, 2008

(65) Prior Publication Data

US 2009/0195794 A1    Aug. 6, 2009

(51) Int. Cl.
*G06F 15/00* (2006.01)
(52) U.S. Cl. .................. 358/1.9; 358/3.06; 358/3.2
(58) Field of Classification Search ............ 358/3.2, 358/1.9, 3.06, 534, 536
See application file for complete search history.

(56) References Cited

U.S. PATENT DOCUMENTS

| | | | |
|---|---|---|---|
| 5,258,849 A * | 11/1993 | Tai et al. | 358/3.12 |
| 5,365,348 A * | 11/1994 | Drees et al. | 358/3.21 |
| 5,535,307 A | 7/1996 | Glass | |
| 5,627,652 A | 5/1997 | Motamed et al. | |
| 5,903,713 A | 5/1999 | Daels et al. | |
| 6,014,226 A | 1/2000 | Harrington et al. | |
| 7,170,640 B2 | 1/2007 | Van de Velde et al. | |
| 7,224,489 B2 | 5/2007 | Loce et al. | |
| 2002/0067509 A1 | 6/2002 | Roylance | |
| 2005/0190408 A1 | 9/2005 | Vittitoe | |
| 2006/0050317 A1 | 3/2006 | Foster et al. | |

FOREIGN PATENT DOCUMENTS

EP    0 946 049 B1    6/2002
JP    11-331584    11/1999

* cited by examiner

*Primary Examiner* — Thomas D Lee
(74) *Attorney, Agent, or Firm* — Michael Blaine Brooks, PC; Michael B. Brooks; David Ripma

(57) ABSTRACT

Method and apparatus for font/line art rendering via multilevel halftoning including the selecting or generating of halftone cell patterns related to the minimal stable pixel of a rendering electrography (EP) engine and image processors including EP engines.

20 Claims, 12 Drawing Sheets

MULTILEVEL HALFTONING FOR TINT GRAPHIC, LINE ART AND TEXT RENDERING

CROSS-REFERENCE TO RELATED APPLICATIONS

This application is related to patent application Ser. No. 12/023,878, filed Jan. 31, 2008.

FIELD OF ENDEAVOR

The invention, in its several embodiments, is related generally to static presentation processing, e.g., processing data for printing, and the invention particularly relates to multilevel halftoning used to represent a gray level, e.g., gray level processing of data for printing via a pattern of print elements, where the print elements have two or more levels of tone, colorant or pigment settings.

BACKGROUND

Halftoning may be described as applying a high frequency/low frequency dichotomy having a low frequency attribute and a high frequency attribute. For example, the low frequency attribute may be a local area of the output image designated as a halftone cell. Each equal-sized cell relates in size and location to a corresponding area of the continuous-tone input image. Within each cell, the high frequency attribute may be a centered, variable-sized, halftone dot or pixel composed of a colorant such as ink or toner.

Single level digital halftoning uses a raster image or bitmap within which each monochrome picture element, or pixel, may be on or off, that is, tone or no tone, ink or no ink. The ratio of the inked area to the non-inked area of the output cell corresponds to the luminance or gray level of the input cell. From a suitable distance, the human image processing averages both the high frequency apparent gray level approximated by the ratio within the cell and the low frequency apparent changes in gray level between adjacent equally-spaced cells and centered dots. To achieve this effect, the digital halftone cell contains groups of monochrome pixels within the same-sized cell area. Printing devices that are capable of printing objects rendered in pixels having two or more density levels, that is two or more gray levels, have a second means of approaching the appearance of a continuous tone scale over the binary state afforded single level halftoning. Accordingly, multilevel halftoning the application of two or more density levels for toning or pigmenting may be applied in conjunction with halftoning to produce refined renderings.

SUMMARY

Toning and pigmenting are used generally to refer to the application of color to a surface, for example by xerographic or electrophotographic processing or ink applications, to produce a static work, such as a printed surface. A tone level or a pigment level are accordingly used generally to refer to the density of toner or pigment applied to a defined region, such as a pixel of an object of a static work, such as a printed surface. Halftoning refers generally to the processing of an object, where the object may be an image or a portion of an image that may be in a grayscale for black or for colors, so as to transform the object to a pattern of small spots, dots or pixels, in order to render the object for printing via a printing device limited to printing with less than continuous tone imagery and/or imagery of less than full-color, i.e., less than an infinite color range. A minimal stable pixel refers generally to the gray level setting of a printing device where the tone or pigment density of a single pixel is sufficient to be repeatably discerned optically as a single pixel of a printed surface.

Method and image processor embodiments of the present inventions include methods of multilevel halftoning and image processors for effecting multilevel halftoning which may, for example, be multilevel halftoning for tint graphic, line art and text rendering. For example, a multilevel halftoning method embodiment of the present invention may comprise the steps of (1) determining a gray level of an object to be rendered; (2) selecting or generating a halftone cell comprising a pixel gray level setting for each of a plurality of pixels associated with the halftone cell, the selecting or generating being based on the determined gray level of the object and a first pixel gray level for a rendering device adapted to render a pixel at one of two or more levels of tone wherein: (a) if the determined gray level of the object is equal to the first pixel gray level for a rendering device, then selecting or generating a first halftone cell for a gray level associated with the first pixel gray level for the rendering device wherein all pixels associated with the halftone cell have a tone level about the level of the first pixel gray level; (b) if the determined gray level of the object is less than the first pixel gray level for a rendering device, then selecting or generating a second halftone cell for a gray level associated with less than the first pixel gray level for the rendering device wherein a plurality of pixels associated with the second halftone cell each have a tone level about the level of the first pixel gray level and the associated plurality of pixels are disposed with reference to the second halftone cell according to a first defined pattern wherein a quantity of the plurality of pixels in relation to all of the pixels associated with the second halftone cell is in proportion to the determined gray level of the object in relation to the first pixel gray level; and (c) if the determined gray level of the object is greater than the first pixel gray level for a rendering device, then selecting or generating a third halftone cell for a gray level associated with a second pixel gray level that is greater than the first pixel gray level for the rendering device, wherein a first plurality of pixels associated with the third halftone cell each have a tone level at the level of the first pixel gray level and a second plurality of pixels associated with the third halftone cell each have a tone level of a second pixel gray level that is greater in value than the level of the first pixel gray level and the second plurality of pixels having a tone level at the second pixel gray level are disposed with reference to the third halftone cell according to a second defined pattern wherein a quantity of the second plurality of pixels having a tone level of about the second pixel gray level in relation the first plurality of pixels of the halftone cell having a tone level of about the first pixel gray level is based on a total quantity of pixels comprising the third halftone cell and is in proportion to the determined gray level of the object related to the second pixel gray level and the first pixel gray level; and (3) halftoning the object with the selected or generated halftone cell. The first pixel gray level of some of the methods of multilevel halftoning embodiment of the present invention may be the minimal stable pixel gray level for the rendering device. The first defined pattern of some of the method of multilevel halftoning embodiments of the present invention may be quantized at one-pixel increments of high spatial frequency disposition. The first defined pattern of some of the methods of multilevel halftoning embodiments of the present invention may be quantized at one-pixel increments of randomly generated dispositions. The second defined pattern of some of the methods of multilevel halftoning embodiments of the present invention may be quantized at four-pixel increments of high spatial frequency disposition. The second defined pattern of some of the method of multi-level halftoning embodiments of the present invention may be quantized at four-pixel increments of randomly generated disposition.

Image processor embodiments of the present invention that are operative to halftone objects may include: (1) a processing unit having addressable memory; (2) a gray level determiner operative to determine a first gray level of a first object to be rendered and a second gray level of a second object to be rendered; (3) a halftone cell selector operative to select a halftone cell based on a determined gray level, wherein the halftone cell selector is adapted to select from a halftone cell library comprising; (a) a first halftone cell for a gray level associated with the first pixel gray level for the rendering device wherein all pixels associated with the halftone cell have a tone level about the level of the first pixel gray level; (b) a second halftone cell for a gray level is associated with less than the first pixel gray level for the rendering device wherein a plurality of pixels associated with the second halftone cell each have a tone level about the level of the first pixel gray level and the associated plurality of pixels are disposed with reference to the second halftone cell according to a first defined pattern wherein a quantity of the plurality of pixels in relation to all of the pixels associated with the second halftone cell is in proportion to the determined gray level of the object in relation to the first pixel gray level; and (c) a third halftone cell for a gray level is associated with a second pixel gray level that is greater than the first pixel gray level for the rendering device, wherein a first plurality of pixels associated with the third halftone cell each have a tone level at the level of the first pixel gray level and a second plurality of pixels associated with the third halftone cell each have a tone level of a second pixel gray level that is greater in value than the level of the first pixel gray level and the second plurality of pixels having a tone level at the second pixel gray level are disposed with reference to the third halftone cell according to a second defined pattern wherein a quantity of the second plurality of pixels having a tone level of about the second pixel gray level in relation the first plurality of pixels of the halftone cell having a tone level of about the first pixel gray level is based on a total quantity of pixels comprising the third halftone cell and is in proportion to the determined gray level of the object related to the second pixel gray level and the first pixel gray level; and (4) a halftoner operative to generate a halftoned version of the object to be rendered. The first pixel gray level for some embodiments of the exemplary image processor may be a minimal stable pixel gray level for the rendering device. The first defined pattern for some embodiments of the exemplary image processor may be quantized at one-pixel increments of high spatial frequency disposition. The first defined pattern for some embodiments of the exemplary image processor may be quantized at one-pixel increments of randomly generated disposition. The second defined pattern for some embodiments of the exemplary image processor may be quantized at four-pixel increments of high spatial frequency disposition. The second defined pattern for some embodiments of the exemplary image processor may be quantized at four-pixel increments of randomly generated disposition.

Additional image processor embodiments of the present invention that are operative to halftone objects may include: (1) a processing unit having addressable memory; (2) a gray level determiner operative to determine a first gray level of a first object to be rendered and a second gray level of a second object to be rendered; (3) a halftone cell generator operative to select from a library or generate a halftone cell based on a determined gray level, wherein: (a) if the determined gray level of the object is equal to the first pixel gray level for a rendering device, then the halftone cell generator selects or generates a first halftone cell for a gray level associated with the first pixel gray level for the rendering device wherein all pixels associated with the halftone cell have a tone level about the level of the first pixel gray level; (b) if the determined gray level of the object is less than the first pixel gray level for a rendering device, then the halftone cell generator selects or generates a second halftone cell for a gray level associated with less than the first pixel gray level for the rendering device wherein a plurality of pixels associated with the second halftone cell each have a tone level about the level of the first pixel gray level and the associated plurality of pixels are disposed with reference to the second halftone cell according to a first defined pattern wherein a quantity of the plurality of pixels in relation to all of the pixels associated with the second halftone cell is in proportion to the determined gray level of the object in relation to the first pixel gray level; and (c) if the determined gray level of the object is greater than the first pixel gray level for a rendering device, then the halftone cell generator selects or generates a third halftone cell for a gray level associated with a second pixel gray level that is greater than the first pixel gray level for the rendering device, wherein a first plurality of pixels associated with the third halftone cell; each have a tone level at the level of the first pixel gray level and a second plurality of pixels associated with the third halftone cell each have a tone level of a second pixel gray level that is greater in value than the level of the first pixel gray level and the second plurality of pixels having a tone level at the second pixel gray level are disposed with reference to the third halftone cell according to a second defined pattern wherein a quantity of the second plurality of pixels having a tone level of about the second pixel gray level in relation the first plurality of pixels of the halftone cell having a tone level of about the first pixel gray level is based on a total quantity of pixels comprising the third halftone cell and is in proportion to the determined gray level of the object related to the second pixel gray level and the first pixel gray level; and (4) a halftoner operative to generate a halftoned version of the object to be rendered. The first pixel gray level for some embodiments of the exemplary image processor may be a minimal stable pixel gray level for the rendering device. The first pixel gray level for some embodiments of the exemplary image processor may be quantized at four-pixel increments of high spatial frequency disposition. The first pixel gray level for some embodiments of the exemplary image processor may be a minimal stable pixel gray level for the rendering device. The first defined pattern for some embodiments of the exemplary image processor may be quantized at one-pixel increments of high spatial frequency disposition. The first defined pattern for some embodiments of the exemplary image processor may be quantized at one-pixel increments of randomly generated disposition. The second defined pattern for some embodiments of the exemplary image processor may be quantized at four-pixel increments of high spatial frequency disposition. The second defined pattern for some embodiments of the exemplary image processor may be quantized at four-pixel increments of randomly generated disposition.

BRIEF DESCRIPTION OF THE DRAWINGS

Embodiments of the present invention are illustrated by way of example and not limitation in the figures of the accompanying drawings, and in which.

DETAILED DESCRIPTION

Figure 1B:
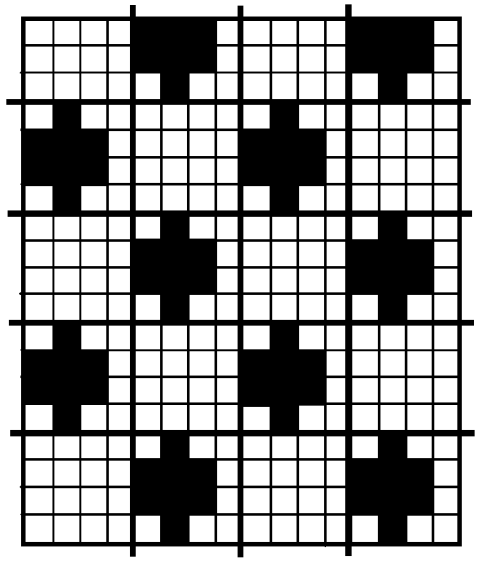
FIG. 1B shows an example of a conventional halftone pattern for a 25% gray level of the color fill.

The smallest region of applied pigmentation or colorant to a surface may be termed a dot or a dot comprised of pixels. The arrangement of pixels may be in lines where the number of lines running laterally to one another may be used to define a linear density of pigmentation. The granularity of pigmentation of a surface, that is its linear density of pigmentation of color fill, may be expressed in dots per inch (dpi) and pixels per inch. The resolution of a halftone screen may be expressed in lines per inch (lpi) which is the number of line of dots or pixels per one inch as measured in parallel with the angle of the screen. So for example, a laser printer having a resolution of 600 dpi may have a halftone screen resolution of 85-105 lpi. Where the pixels may be expressed as squares, a square matrix may be configured having an equal number of rows of pixels as columns of pixels. The pixels or square matrix may be pigmented in order to express a portion of a rendering. When a rendering device is capable of only one level of pigmentation, for example, black renderings having the appearance of gray may be produced by withholding the application of pigment to less than the entire number of pixels in a matrix that would otherwise receive pigmentation if black was the desired color of appearance as the color fill. A technique for applying the withholding of pigmentation to achieve a desired level of gray is a halftone cell. A halftone cell may be a matrix of two pixels by two pixels or greater. For example, a two-by-two halftone cell pattern may be configured so that three levels of gray may be perceived between a white surface within the matrix and a black rendering, where all four pixels within the matrix are pigmented. By allowing one, two, or three pixels to be pigmented in a case where a black rendering would invoke pigmenting of all four pixels, a halftone cell provides for the perception of gray level by human visual processing. In similar fashion, a four-by-four halftone cell pattern may be configured so that fifteen levels of gray may be perceived and likewise an eight-by-eight halftone cell pattern may be configured so that sixty-three halftone cell patterns may be configured. In an exemplary application for a tint graphic, line art and text rendering, a halftone cell pattern may function as a screen where a graphic object such as a font character of a portion of text, quantized into an array or matrix of pixels, may have one or more pixels that do not coincide with pixels allowing pigmentation or toning according to the halftone pattern applied to reflect the desired gray level. Accordingly, these one or more pixels will not be rendered in pigment, colorant or toner. The finer and lighter in gray level the object is to be rendered by a printing device, the more likely a portion of its pixels will not be rendered as the gray level desired moves further from black toward the non-pigmented or non-toned.

A page description language (PDL) specifies the arrangement of a printed page through commands from a computer that the printer executes. For high density dpi rendering devices, a PDL interpreter may render black fonts, text, and line art in a level set at 1-bit, i.e., black, or non-pigmented, per pixel, in an attempt to print with optimized speed. For gray fonts and line art, a halftone pattern may be applied, as described above, where a pattern of black and non-pigmented pixels is used to visually approximate a level of gray. For lighter colors and/or a visually approximate blending of colors for fonts and line art, the halftone patterns may be applied as well. By precluding the pigmenting of pixels, the pattern applied to fonts and line art greatly affects the rendered pixels when lighter tones are executed.

Figure 1D:
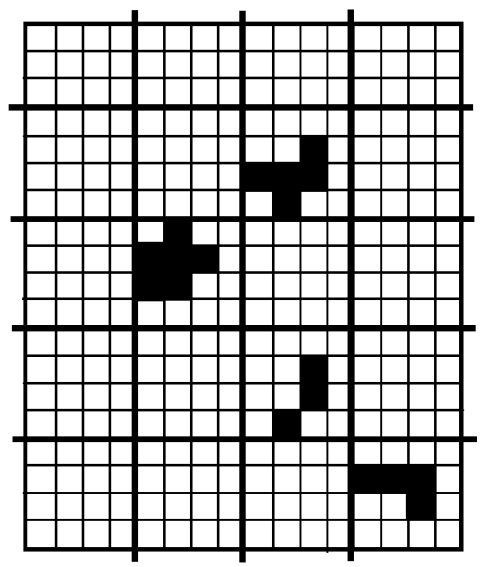
FIG. 1D shows an example of the output of a 25% gray level.
Figure 1A:
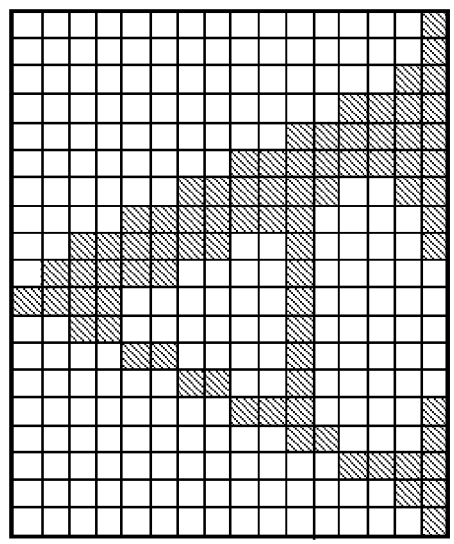
FIG. 1A shows an example of a scaled source data at device resolution prior to rendering a color fill.
Figure 1C:
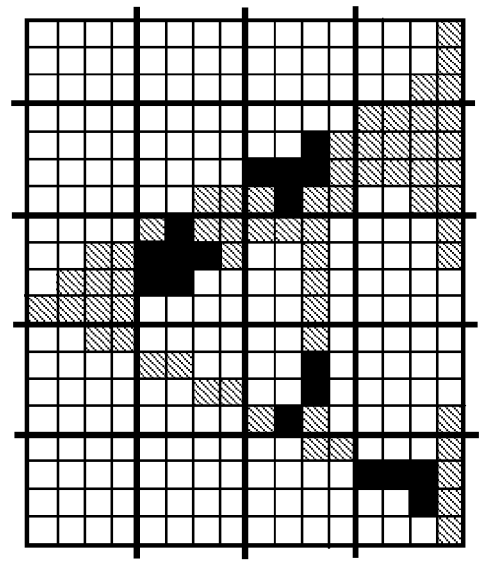
FIG. 1C shows an example of the output of overlapping pixels for a conventional 25% gray level.

FIGS. 1A-1D show prior art examples of a 25% gray letter "A." FIG. 1A illustrates a scaled source data at device resolution prior to the steps pertaining to a rendering such as a color fill. FIG. 1B illustrates a conventional halftone pattern for a 25% gray level that may be applied to approximate the gray level, i.e., the lightness, of the color fill. FIG. 1C illustrates the overlapped pixels that will show on the output. FIG. 1D illustrates the rendered output of "A." Due to the conventional halftone pattern for a 25% gray level, portions of the font that lie in the portions of pixels to remain without pigment contain visual information that may be necessary to discern the character which, albeit, may be perceived being lighter in color.

Figure 2A:
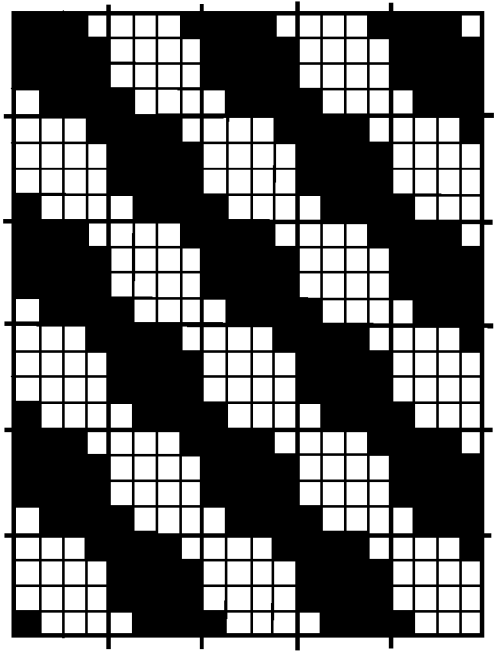
FIG. 2A shows an example of a scaled source data at device resolution before a color fill.
Figure 2B:
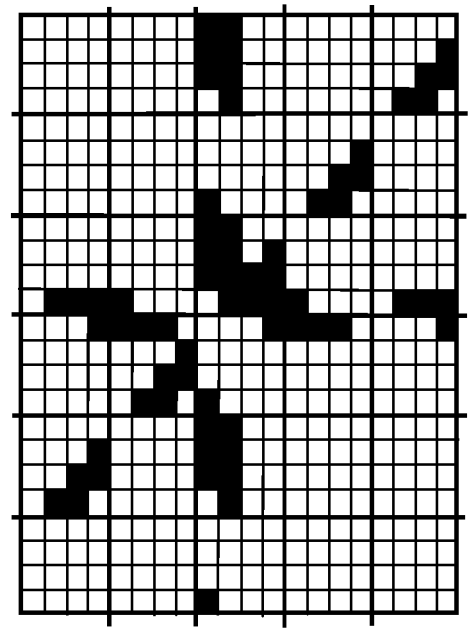
FIG. 2B shows an example of a conventional halftone pattern for a 50% gray level of the color fill.
Figure 2C:
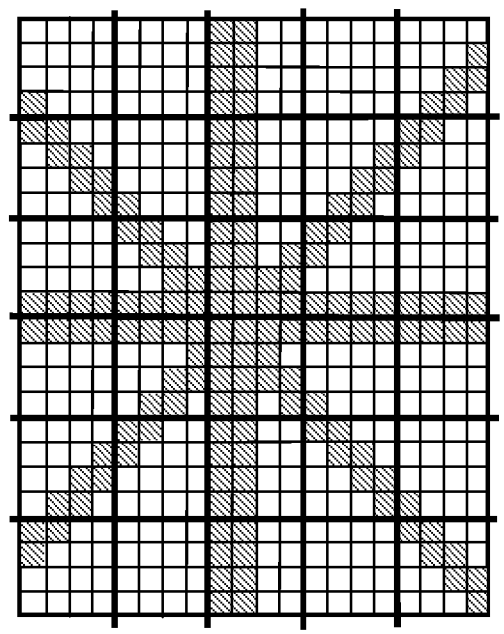
FIG. 2C shows an example of the overlapped pixels for a conventional 50% gray level.
Figure 2D:
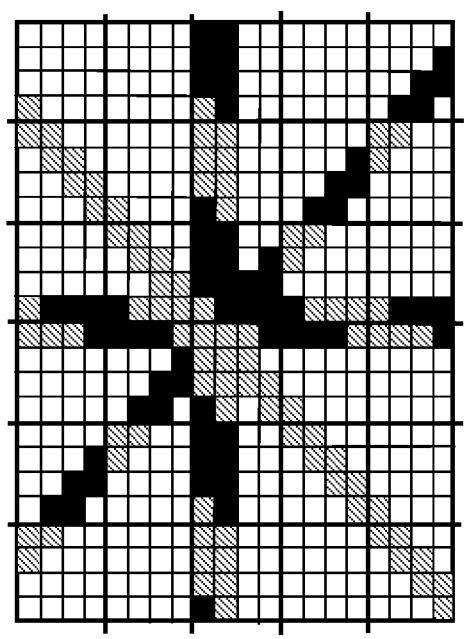
FIG. 2D shows an example of the rendered output of lines for a conventional 50% gray level.

FIGS. 2A-2D illustrate prior art examples of line art having 2-pixel-wide lines when the color is to be expressed at a 50% gray level, i.e., 50% lighter than the fully pigmented matrix. FIG. 2A shows the scaled source data in device resolution right before color fill. FIG. 2B shows a conventional halftone pattern for a 50% gray level that may to be applied to approximate the 50% gray level, i.e., the lightness, of the color fill. FIG. 2C illustrates the overlapped pixels that will show as pigmented on the rendered output. FIG. 2D illustrates the rendered output of lines where one may note a missing line of the line art where the source image (FIG. 2A) missed the halftone orientation (FIGS. 2B and 2C).

When the rendering device is capable of two or more levels of pigmentation per pixel, the multi-level pigmentation provides another degree of freedom to the spatial arrangements of halftone cell patterns. For instances where multi-level pigmentation is available, a halftone pattern may be applied to achieve visual approximations of gradations between these levels and such halftone patterns may preclude legible renderings of fonts and line arts at the lighter levels of pigmentation. Halftone cell patterns for renderings capable of multi-level pigmentation may be defined for various gray levels by starting with the lowest level of pigmentation that is consistently repeatable by the rendering device as producing a perceptible pigmentation of a pixel and applying this level of pigmentation to an increasing number of pixels within the halftone cell according to a growth pattern. Higher gray levels may be defined and may depend on the processing capabilities, the dpi, and the minimal levels of pigmenting, i.e., for colors and for black, of the rendering device. For some embodiments, a high frequency pattern of filling may be preferred. That is, the pixels to be filled for a particular gray level would be less spatially correlated than the 25% and 50% conventional halftone patterns illustrated above. At the point in the defining of patterns, when the halftone cell is entirely populated with pixels allowed to be pigmented at the lowest level, all of the pixilated object contained within the matrix may be rendered, albeit as the lowest level of pigmentation. Once the halftone cell is entirely populated with pixels allowed to be pigmented at the lowest level, a higher level of pigmentation is applied to an increasing number of pixels according to a growth pattern, and the growth process may continue for yet higher levels of pigmentation.

Figure 3:
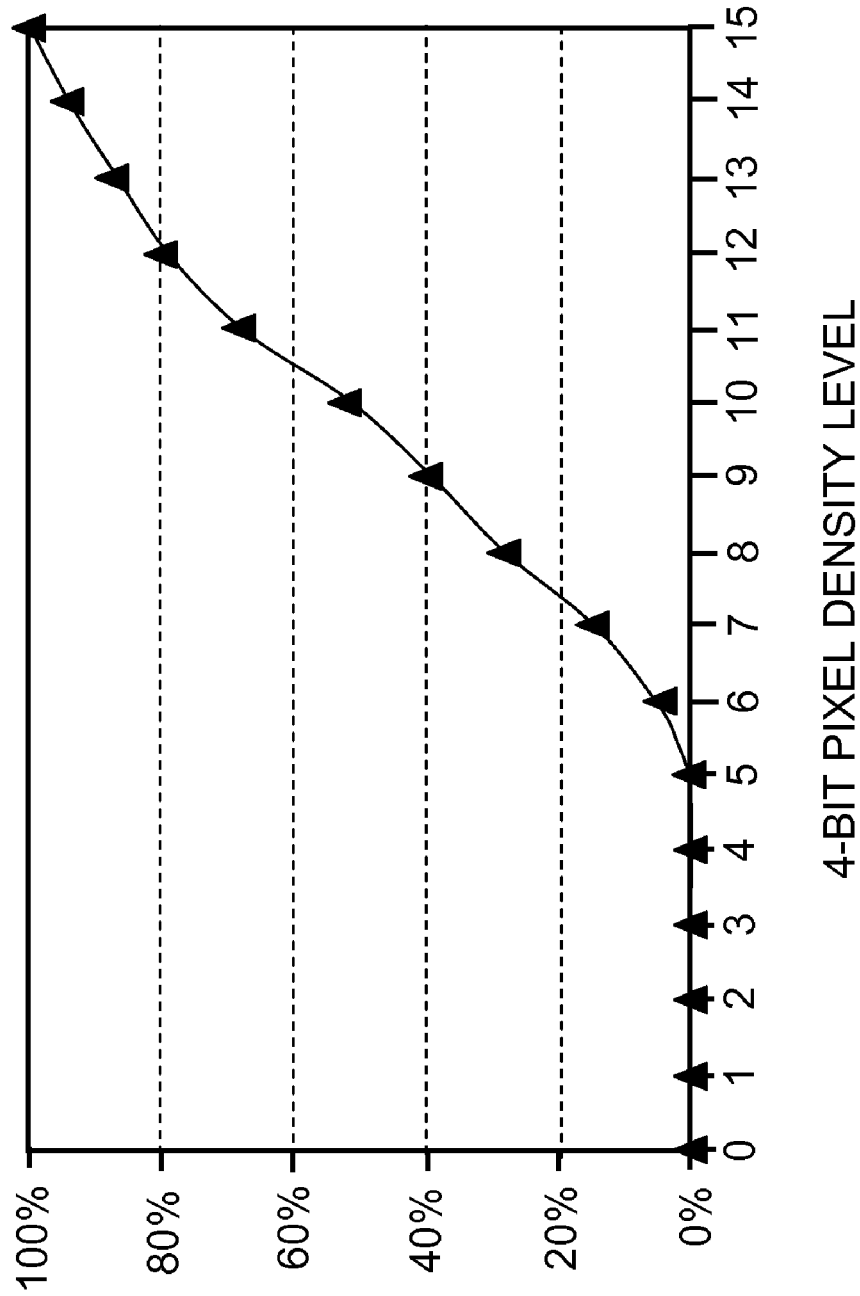
FIG. 3 shows an example of an output tone curve of an isolated single pixel of an exemplary 4-bit electrophotography engine, according to an embodiment of this invention.

While a black or white rendering of a pixel may be expressed as 1-bit output, a multilevel output may expressed as m-bit output where m has the value of two or more. For example, an electrophotography engine (EP) that is capable of 4-bit output for an isolated pixel may be described as ideally having sixteen density levels: from level zero through level fifteen. Of course, it is the density of the tone on the printed paper that is of interest for visual perception. In this example, the density percentage on paper may not rise above negligible until level six. An output tone curve of an isolated single pixel of the exemplary 4-bit EP engine is depicted in FIG. 3 as a function of (4-bit) pixel density level.

A raster image processor (RIP) is a firmware device or subsystem combination of hardware and software that functions to convert images described in the form of vector graphics statements into raster graphics images or bitmaps. For example, text in a specified font may be sent to a laser printer and the printer may employ a RIP to the convert images that arrive at the printer in vector form, into a rasterized form so that they may be printed. When a color controller or RIP renders an object of font or line art, it is not always necessary to apply halftoning if the color is solid black or solid cyan, magenta, or yellow. But, for less than solid tones, halftoning may be applied. Halftoning may be described as having two major stages where the first stage is preparing the halftone screens and the second stage is applying screens to render/halftone the input image/objects. To prepare the screens, these may be prepared before compiling the firmware, or the screens may be prepared during the system initiation. Once the screens are built into the memory, there may be no need to build them again until the system hosting the halftones is rebooted.

For a bitonal screen, a threshold may be set for filling each pixel in a halftone dot/matrix where, if a pixel threshold is tripped, a colorant is applied to the pixel. For a multi-level screen, the development of a screen is typically more complicated over the bitonal screen. There are at least three possible formats for developing multi-level screens: (a) separate screens for 2-bit density tones; (b) pointing to procedures for 4-bit or higher density tones; and (c) separate screens for 2-bit and 4-bit or higher density tones. For example, if the output device is adapted to lay down 2-bit density tones: 0, 1, 2, and 3; then, one may prepare a separate screen matrix, with threshold values, for each tone level. So, for a 2-bit color device, there may be stored in memory three screen matrices for each color, C, M, Y, or K, where K is black. If the tone level is 4-bit or higher, the above format may require too many screen matrices for a memory-limited device. So, rather than storing the several screen matrices, the second exemplary format may comprise a matrix of "point" that points to a particular procedure to decide which tone level should be output for the current input pixel based on the current position of screen pixel/cell. If the tone level is 4-bit or higher and the rendering device is not memory-limited, then in consideration of higher performance as gauges by speedier rendering, a table-based screen matrix may be applied; e.g., one matrix for each color. Each screen position/cell/pixel points to a particular array of lookup tables that consists of 256 elements for the entire range of input gray levels from 0 to 255.

As to the second stage of halftoning, i.e., the application of the halftoning, rather than taking an average of neighbors, the application is done pixel by pixel. So, in order to run the halftoning, the current position on the screen must be tracked. So, for each pixel, the input gray level is compared to the threshold value of the current screen position to decide the output tone in the case of the 2-bit rendering device. In the case of the memory-limited 4-bit rendering device, the correspondent procedure to decide the output tone based on the input gray level is executed. In the case of the case of the 4-bit rendering device having ample memory, based on the current screen position, the output tone level is based on the input gray level according to a lookup table per color. This lookup table approach may be applied to 2-bit rendering devices and higher.

Figure 4:
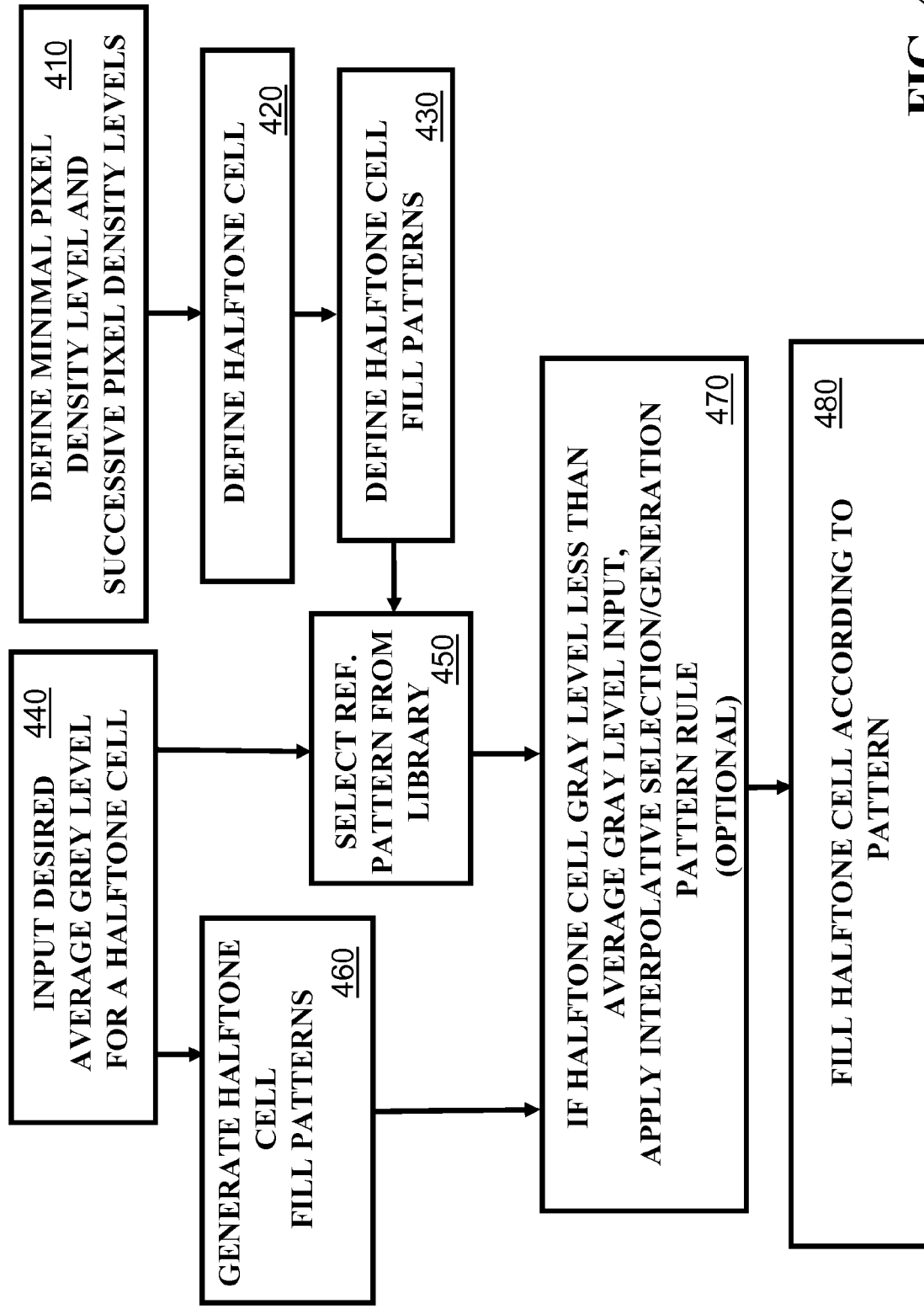
FIG. 4A is a flowchart of an exemplary method of multi-level halftoning embodiment of the present invention.
FIG. 4B is a flowchart of an exemplary method of interpolating halftone cell pattern for a multilevel halftoning embodiment of the present invention.
Figure 4:
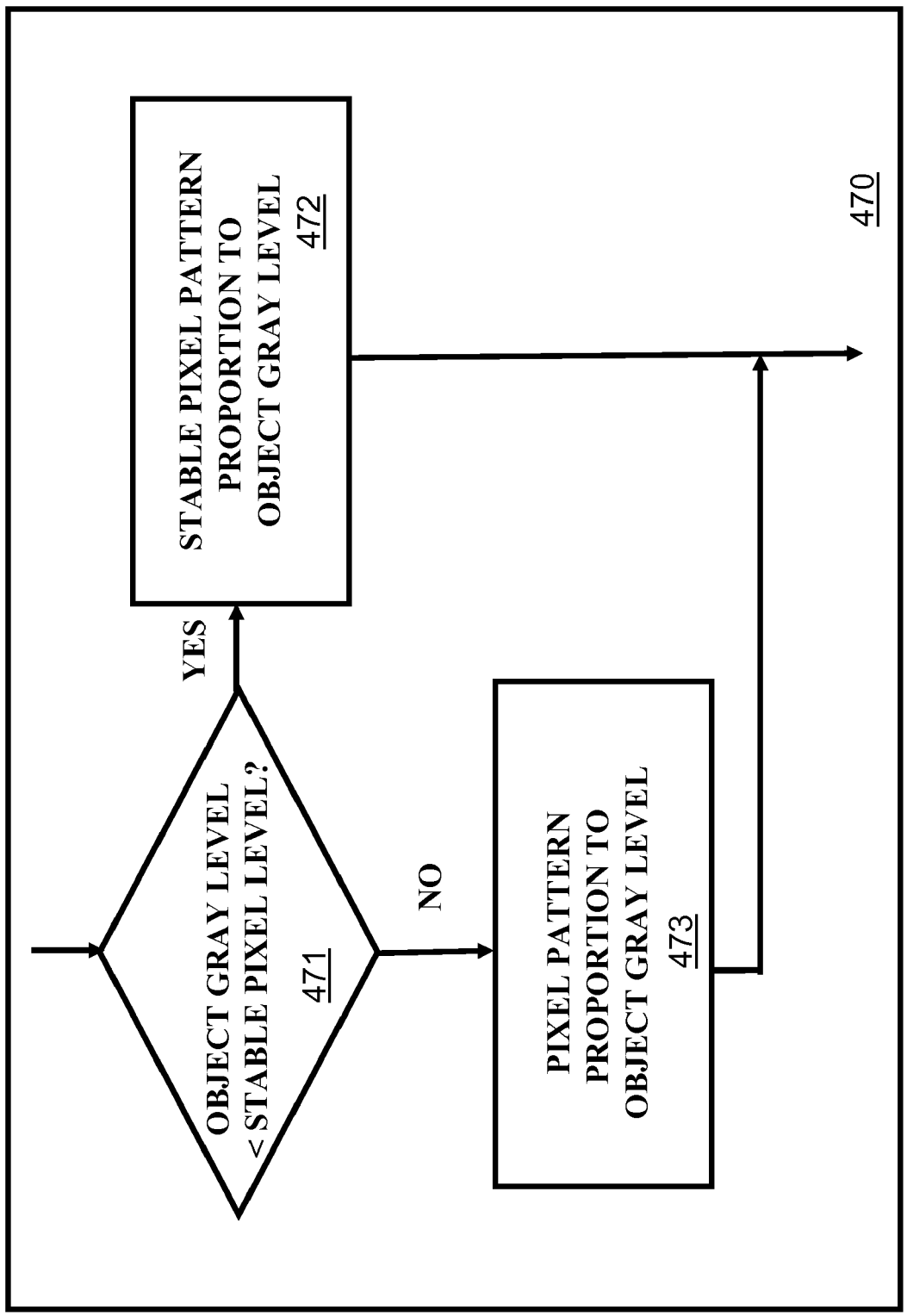

FIGS. 4A and 4B illustrate exemplary method and image processor embodiments of the present inventions which include methods of multilevel halftoning and image processors for effecting multilevel halftoning and particularly as to an example of preparing the screens. For example, in FIG. 4A, a method of multilevel halftoning embodiment of the present invention may comprise the steps of: (a) determining or defining the minimal pixel pigment or tone density level (step 410) and may include determining or defining successive pixel density level for rendering via a particular printing device; (b) determining or defining the matrix of pixels (step 420) that comprise the halftone cell; (c) generating one or more reference halftone patterns (step 430) for embodiments having a library selection of reference halftone patterns; (d) inputting the desired average halftone gray level of an object to be rendered (step 440); (e) selecting a reference halftone pattern (step 450) based on the input average gray level; (f) generating one or more reference halftone patterns (step 460) for embodiments that do not select from a library of reference halftone patterns; (g) if the determined gray level of the object is less than the average gray level input for a rendering device, then selecting or generating an interpolated halftone pattern (step 470), and (h) halftoning the object with the selected or generated halftone cell pattern (step 480).

Optional interpolative generation of halftone cell patterns (470) that may fall, according to an average gray scale, between two reference halftone cell patterns may be expressed as a sub-process in FIG. 4B as follows: (a) if the determined gray level of the object is less than the first pixel gray level for a rendering device (test 471), then selecting or generating a second halftone cell for a gray level associated with less than the first pixel gray level for the rendering device (step 472) wherein a plurality of pixels associated with the second halftone cell each have a tone level about the level of the first pixel gray level and the associated plurality of pixels are disposed with reference to the second halftone cell according to a first defined pattern wherein a quantity of the plurality of pixels in relation to all of the pixels associated with the second halftone cell is in proportion to the determined gray level of the object in relation to the first pixel gray level; and (b) if the determined gray level of the object is equal to or greater than the first pixel gray level for a rendering device (test 471), then selecting or generating a third halftone cell for a gray level associated with a second pixel gray level that is greater than the first pixel gray level for the rendering device (step 473), wherein a first plurality of pixels associated with the third halftone cell each have a tone level at the level of the first pixel gray level and a second plurality of pixels associated with the third halftone cell each have a tone level of a second pixel gray level that is greater in value than the level of the first pixel gray level and the second plurality of pixels having a tone level at the second pixel gray level are disposed with reference to the third halftone cell according to a second defined pattern wherein a quantity of the second plurality of pixels having a tone level of about the second pixel gray level in relation the first plurality of pixels of the halftone cell having a tone level of about the first pixel gray level is based on a total quantity of pixels comprising the third halftone cell and is in proportion to the determined gray level of the object related to the second pixel gray level and the first pixel gray level. The first pixel gray level of some of the method of multilevel halftoning embodiment of the present invention may be the minimal stable pixel gray level for the rendering device. The first defined pattern of some of the method of multilevel halftoning embodiments of the present invention may be quantized at one-pixel increments of high spatial frequency disposition. The first defined pattern of some of the method of multilevel halftoning embodiments of the present invention may be quantized at one-pixel increments of randomly generated disposition. The second defined pattern of some of the method of multilevel halftoning embodiments of the present invention may be quantized at four-pixel increments of high spatial frequency disposition. The second defined pattern of some of the method of multilevel halftoning embodiments of the present invention may be quantized at four-pixel increments of randomly generated disposition.

Figure 5A:
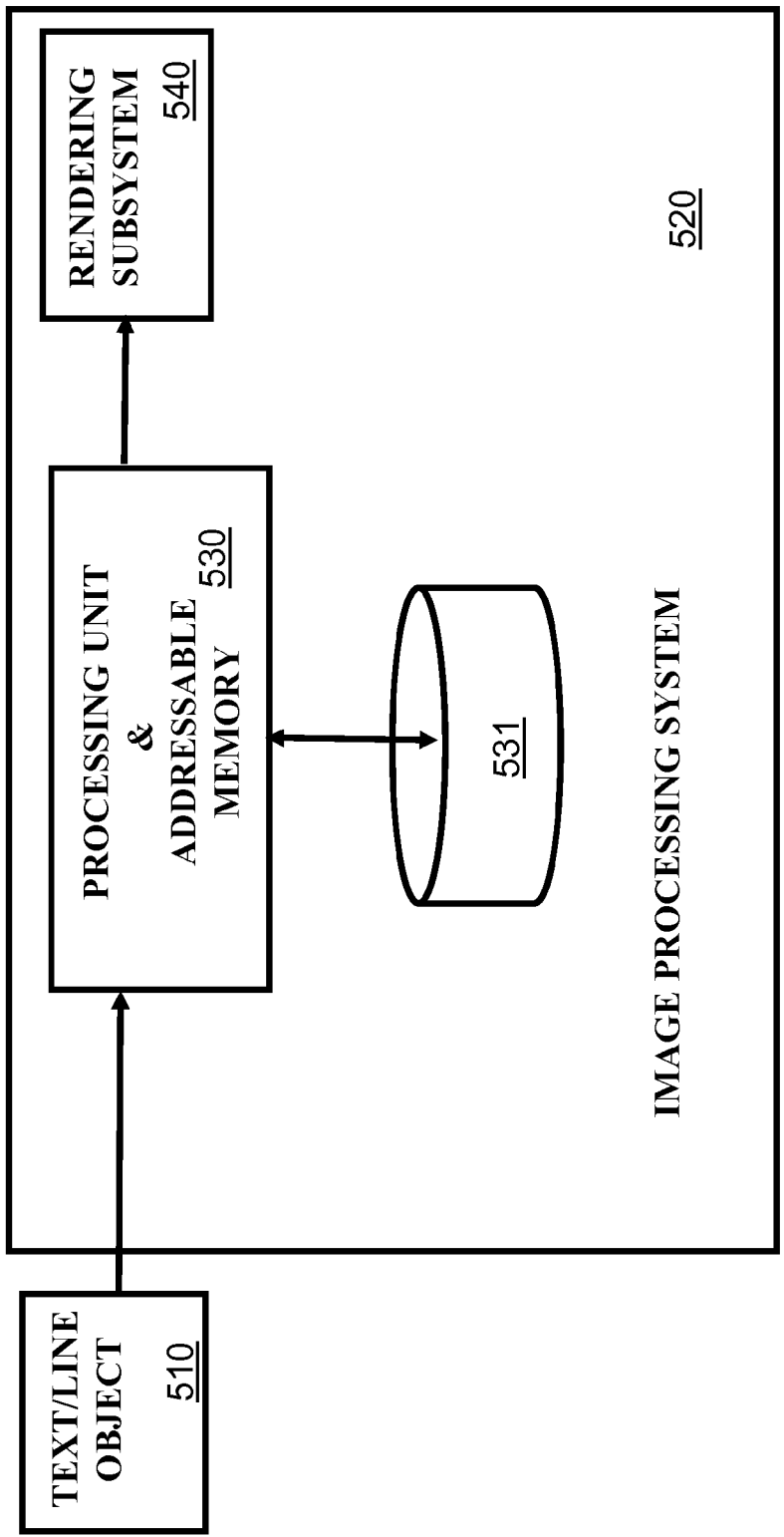
FIG. 5A is a functional block diagram of an exemplary image processor embodiment of the present invention.
Figure 5B:
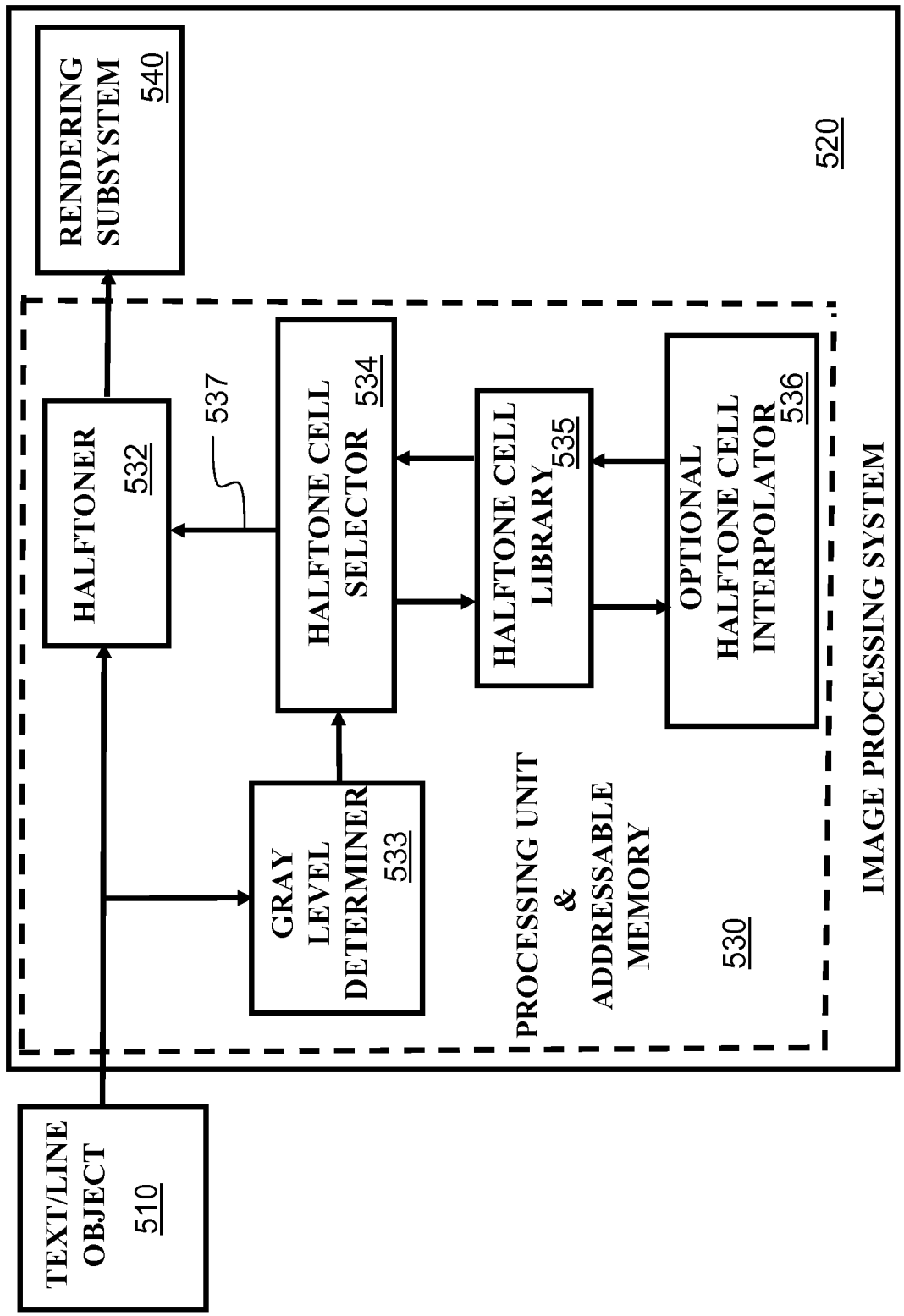
FIG. 5B is a functional block diagram of an exemplary image processor embodiment of the present invention.

FIG. 5A represents an example of an exemplary image processor embodiment of the present invention that is operative to halftone objects. A text or line object 510 may be the input to an image processing system 520 comprising a processing unit and addressable memory 530 and may further include a store comprising halftone cell pattern. The image processing system 520 may have a rendering subsystem 540 in communication with the processing unit 530 or may be integral to the processing unit 530. FIG. 5B illustrates in an exemplary functional block diagram the functions of the processing unit and addressable memory 530 detailed in functional blocks in which a text or line object 510 is sent to a gray level determiner 533 operative to determine a first gray level of a first object to be rendered and a second gray level of a second object to be rendered; then a halftone cell selector 534 operative to select a halftone cell based on a determined gray level, wherein the halftone cell pattern selector 534 is adapted to select from a halftone cell pattern library 535 comprising one or more reference halftone cell patterns which may include or have access to a halftone cell pattern interpolator 536. The selected halftone cell pattern 537 is shown provided to the halftoner 532 where the text or line object is prepared for rendering and sent to the rendering device 540.

The first pixel gray level for some embodiments of the exemplary image processor may be a minimal stable pixel gray level for the rendering device. In some embodiments, the halftone cell selector 534 is replaced by a halftone cell generator. Whether generated in line with the gray level determination or generated and placed in a reference library of reference halftone cell patterns to be selected after gray level determination, some of the intermediate or interpolated patterns may be generated as follows: (a) a first halftone cell for a gray level associated with the minimal stable, or first, pixel gray level for the rendering device wherein all pixels associated with the halftone cell have a tone level about the level of the first pixel gray level; (b) a second halftone cell for a gray level is associated with less than the first, or minimal stable, pixel gray level for the rendering device wherein a plurality of pixels associated with the second halftone cell each have a tone level about the level of the first pixel gray level and the associated plurality of pixels are disposed with reference to the second halftone cell according to a first defined pattern wherein a quantity of the plurality of pixels in relation to all of the pixels associated with the second halftone cell is in proportion to the determined gray level of the object in relation to the first pixel gray level; and (c) a third halftone cell for a gray level is associated with a second pixel gray level that is greater than the first pixel gray level for the rendering device, wherein a first plurality of pixels associated with the third halftone cell each have a tone level at the level of the first pixel gray level and a second plurality of pixels associated with the third halftone cell each have a tone level of a second pixel gray level that is greater in value than the level of the first pixel gray level and the second plurality of pixels having a tone level at the second pixel gray level are disposed with reference to the third halftone cell according to a second defined pattern wherein a quantity of the second plurality of pixels having a tone level of about the second pixel gray level in relation the first plurality of pixels of the halftone cell having a tone level of about the first pixel gray level is based on a total quantity of pixels comprising the third halftone cell and is in proportion to the determined gray level of the object related to the second pixel gray level and the first pixel gray level. The first defined pattern for some embodiments of the exemplary image processor may be quantized at one-pixel increments of high spatial frequency disposition. The first defined pattern for some embodiments of the exemplary image processor may be quantized at one-pixel increments of randomly generated disposition. The second defined pattern for some embodiments of the exemplary image processor may be quantized at four-pixel increments of high spatial frequency disposition. The second defined pattern for some embodiments of the exemplary image processor may be quantized at four-pixel increments of randomly generated disposition.

While the exemplary 4-bit EP engine may be limited at the single pixel level to sixteen levels, where the first stable pixel level appears to be level six, the resulting curve shown in FIG. 3 has curvature. A linearized form of this curve may be useful readily processing and rendering text and line art having predictable visual approximations to the desired gray level. A finer set of levels may be applied to achieve such a linearization and the finer set of levels may be based on eight bits. In such instances, the exemplary 4-bit EP engine may be tuned to output linear gray levels that start from an 8-bit level of 32 that has been set to correspond to a 4-bit level of one. Likewise an 8-bit level of 255 has been set to correspond to a 4-bit level of 15. Table I relates the gray levels of the exemplary 4-bit EP engine with the 8-bit output linear gray levels, where, in this example, for the exemplary type of EP engine, the stable pixel starts at level 6 of the 4-bit levels and level 6 may represents the gray level of 112 in 8-bits.

TABLE 1

AVAILABLE GRAY LEVELS

| 4-bit | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 8-bit | 32 | 48 | 64 | 80 | 96 | 112 | 128 | 144 | 160 | 176 | 192 | 208 | 224 | 240 | 255 |

Figure 6:
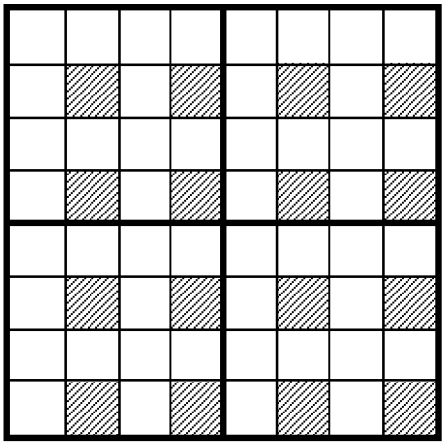
FIG. 6A illustrates an exemplary matrix of 8-by-8 pixels, according to an embodiment of this invention and an exemplary fill legend.
FIG. 6B illustrates an example of an exemplary halftone growth pattern, according to an embodiment of this invention.
FIG. 6C illustrates an example of an exemplary halftone growth pattern, according to an embodiment of this invention.
FIG. 6D illustrates an example of an exemplary halftone growth pattern, according to an embodiment of this invention.
FIG. 6E illustrates an example of an exemplary halftone growth pattern, according to an embodiment of this invention and an exemplary fill legend.
FIG. 6F illustrates an example of an exemplary halftone growth pattern, according to an embodiment of this invention.
FIG. 6G illustrates an example of an exemplary halftone growth pattern, according to an embodiment of this invention.
FIG. 6H illustrates an example of an exemplary halftone growth pattern, according to an embodiment of this invention.
FIG. 6I illustrates an example of an exemplary halftone growth pattern, according to an embodiment of this invention.
FIG. 6J illustrates an example of an exemplary halftone growth pattern, according to an embodiment of this invention and an exemplary fill legend.
Figure 6:
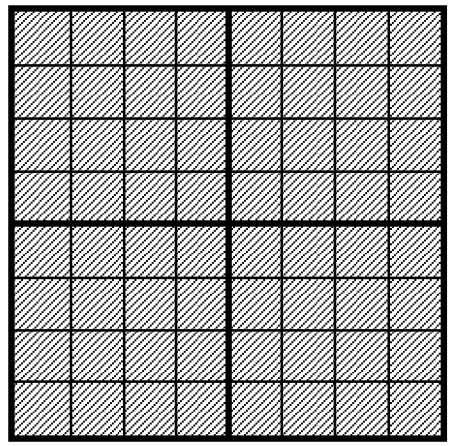
Figure 6:
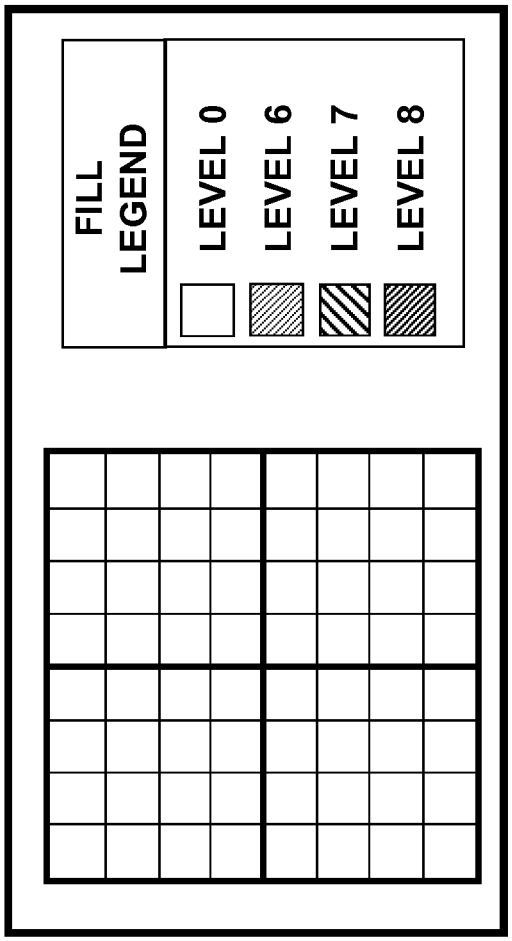
Figure 6:
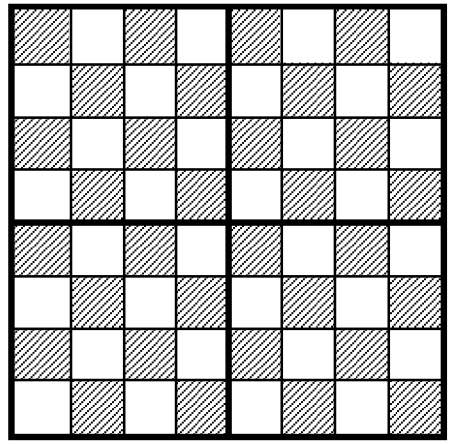
Figure 6:
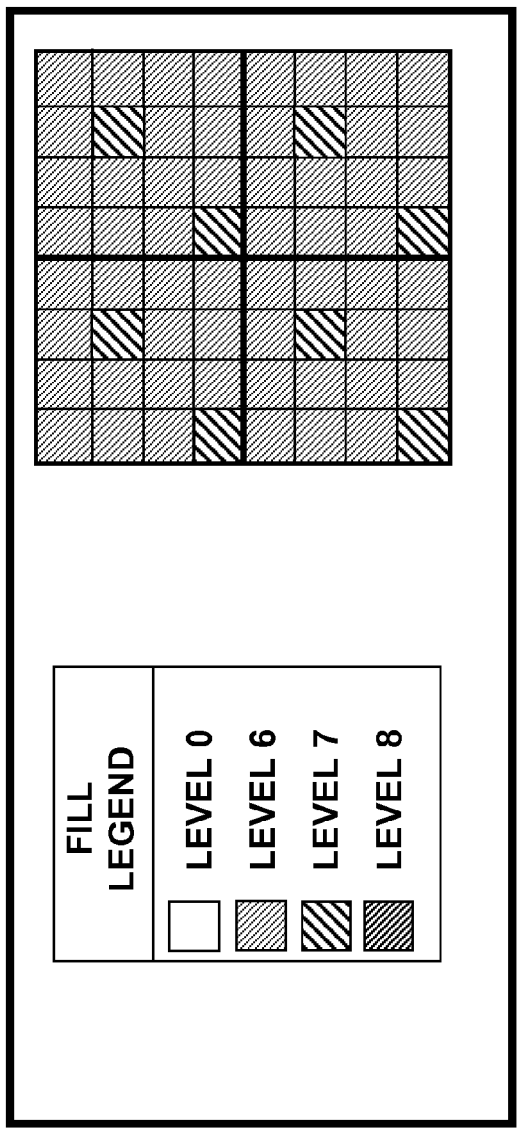
Figure 6:
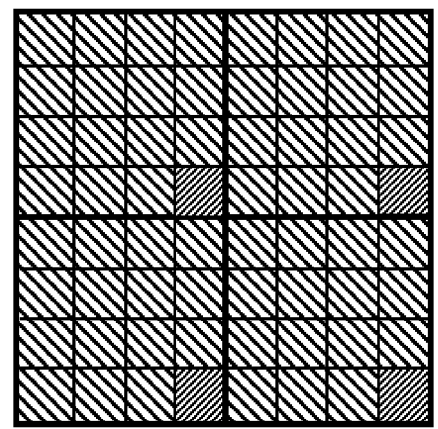
Figure 6:
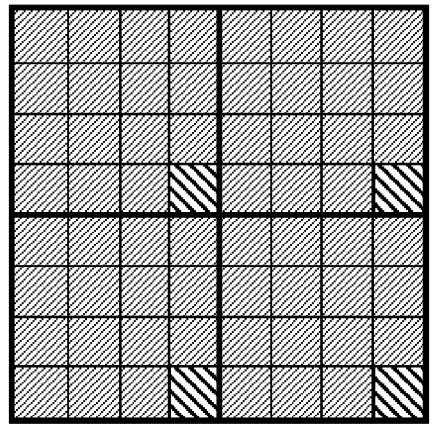
Figure 6:
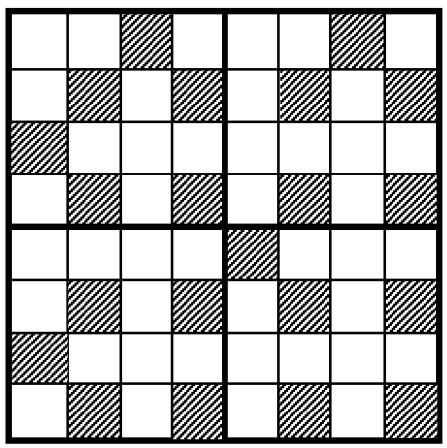
Figure 6:
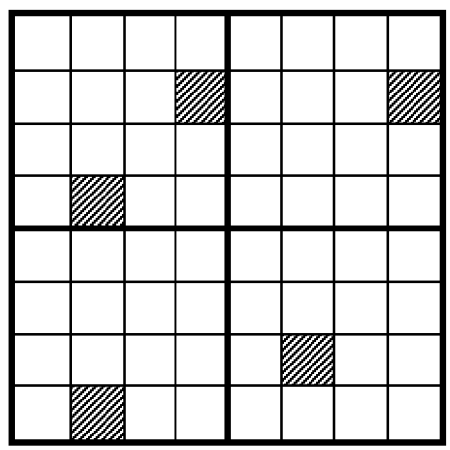
Figure 6:
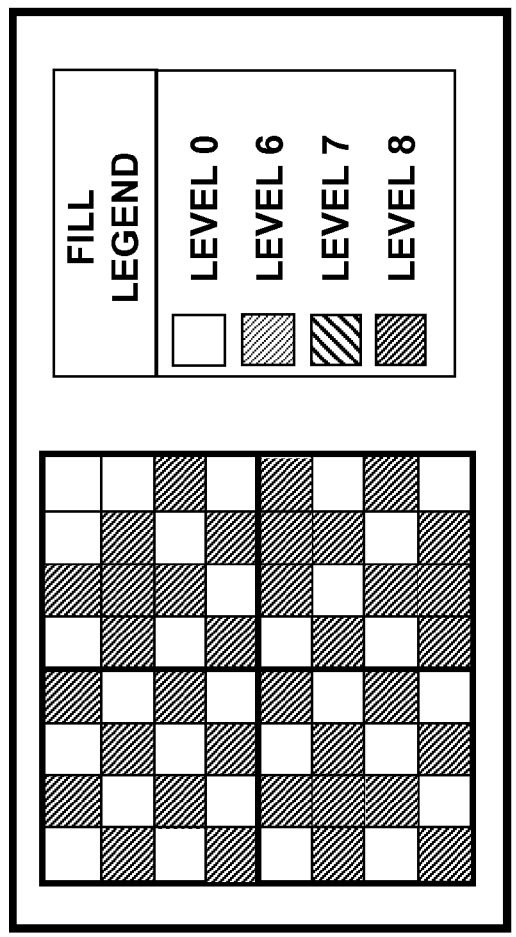

With regard to the halftone pattern of a device capable of multilevel tones per pixel, an exemplary matrix of 8-by-8 pixels (FIG. 6A) may be chosen to illustrate a halftone growth pattern embodiment of the present invention. FIGS. 6B-6J illustrate various halftone growth patterns resulting from embodiments of the present invention. The development of the halftone growth patterns may generally be described in two stages. In the first stage, halftone patterns may be established according to a selected high frequency pattern of the lowest stable pixel which in these examples is the 4-bit gray level of level 6. Such exemplary halftone patterns are illustrated in FIGS. 6B and 6C and the first stage is complete with initial halftone patterns when all pixels of the 8-by-8 cell are filled with level 6 pixels. Key or reference patterns may be defined such as those of FIGS. 6B-6D which may be referenced for purposes of relating average gray levels and may particularly be referenced in these examples as relating to the 8-bit gray levels. In terms of visual averaging, each pixel in this example of the level 6 (4-bit) pixel of the first stage across an 8-by-8 matrix, or halftone cell, represents an average gray level of 112/64, or 7/4. Accordingly, the halftone pattern of FIG. 6B has sixteen pixels of gray level 6 (4-bit) and so represents an average gray level of 16 times 7/4, that is, 28. Likewise, the halftone pattern of FIG. 6C, having 32 pixels of gray level 6 (4-bit), represents the average gray level of 56, and FIG. 6D, having 64 pixels of gray level 6 (4-bits), represents the average gray level of 112 (8-bits). Halftone patterns of multi-level tones where the halftone patterns result in an average gray level of greater than 112 (8-bits) will, in these examples, have no pixels unfilled with at least the level 6 pixel tone. Accordingly, as to the rendering of fonts and line art via the exemplary EP engine, each pixel should be rendered by the exemplary device with the jaggy edges or missing lines as illustrated above in FIGS. 1A-1D and FIGS. 2A-2D.

For average gray levels lower than that of FIG. 6B, the fill positions of FIG. 6B may be re-designated as white, i.e., without tone, according to a random pattern or an ordered pattern such as one that maintains a higher spatial frequency. FIG. 6H illustrates an example of random pattern for a halftone pattern degenerated from FIG. 6B having an average gray level of five times 7/4, that is, approximately nine (8-bits). Alternatively, one may start with all white, i.e., untoned, pixels and add tone to pixels of the gray level 6 tone according to an ordered or random pattern, so long as they fall within the FIG. 6B halftone pattern. For average gray levels lower than that of FIG. 6C but greater than 6B, the fill positions of FIG. 6C that are not also fill positions of FIG. 6B may be re-designated as white, i.e., without tone, according to a random pattern or an ordered pattern such as one that maintains a higher spatial frequency. Alternatively, one may start with FIG. 6B and add tone to pixels of gray level 6 tone according to an ordered or random pattern, so long as they fall within the FIG. 6D halftone pattern. FIG. 6I illustrates an example of random pattern for a halftone pattern degenerated from FIG. 6C having an average gray level of 20 times 7/4, that is, approximately 35 (8-bits). For average gray levels lower than that of FIG. 6D but greater than 6C, the fill positions of FIG. 6D that are not also fill positions of FIG. 6C may be re-designated as white, i.e., without tone, according to a random pattern or an ordered pattern such as one that maintains a higher spatial frequency. Alternatively, one may start with FIG. 6C and add tone to pixels of the gray level 6 tone according to an ordered or random pattern, so long as they fall within the FIG. 6D halftone pattern. FIG. 6J illustrates an example of random pattern for a halftone pattern degenerated from FIG. 6D having an average gray level of 36 times 7/4, that is, approximately 63 (8-bits). The preferred gradation in pixels added or removed from the various halftone patterns is one at a time.

A second stage of exemplary halftone cell pattern generation may be defined for average gray tones higher than 112 (8-bits), i.e., once all 64 pixels of the cells are toned to the lowest stable tone level for a pixel, which in these examples have been defined as level 6 (4-bit). For this second stage, it may be preferred to change the level of tone for each pixel at a rate of four pixels at a time. For example, the next multilevel gray level of the exemplary EP engine may be level 7 (4-bits). The four-pixel pattern may be distributed across the four four-by-four sub-matrices that comprise the 8-by-8 matrix of pixels that comprise the halftone cell in FIG. 6E. A next set of four pixels may be elevated to level 7 (4-bits) according to an ordered or random pattern as in FIG. 6F. Once all 64 pixels are of a gray level 7 (4-bits), a four-at-a-time elevation to a gray level of 8 (4-bits) may be executed to build up the next subset of patterns as in FIG. 6G. These halftone patterns may increase in gray level elevations until all pixels are at the gray tone level of 15 and full solid density is reached. The gray level 7 pixel in an 8-by-8 matrix represents an average gray level of 128/64, or two, and so the halftone cell pattern of FIG. 6E represents the average gray level of 113, i.e. 60 times 7/4 plus four times two. The halftone cell pattern of FIG. 6F represents the next gray level of 114, i.e., 56 times 7/4 plus eight times two. The halftone cell pattern of FIG. 6F represents the gray level of 129 that all pixels are filled with 4-bit level 7 except four pixels that are filled with 4-bit level 8.

Figure 7A:
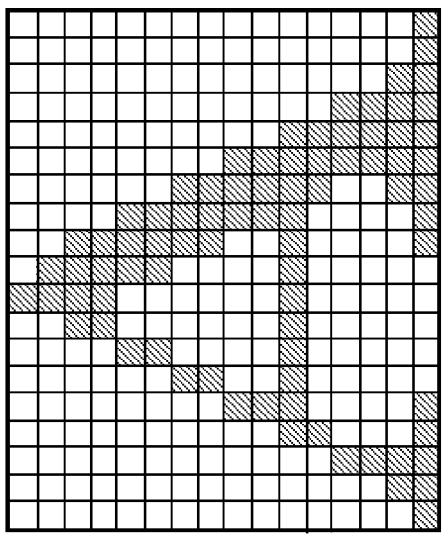
FIG. 7A shows an example of a scaled source data at device resolution prior to rendering a color fill where its 8-bit gray level is at 32.
Figure 7B:
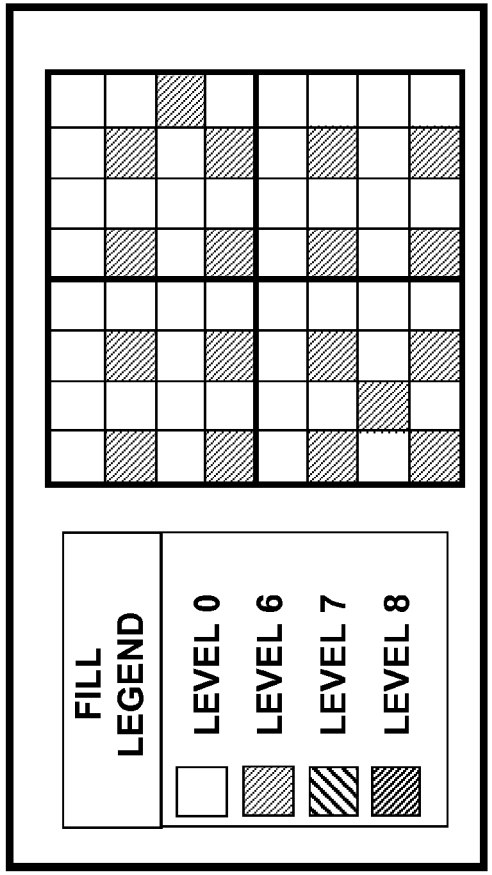
FIG. 7B illustrates an example of an exemplary halftone pattern interpolated between two reference halftone patterns, according to an embodiment of this invention and an exemplary fill legend.
Figure 7D:
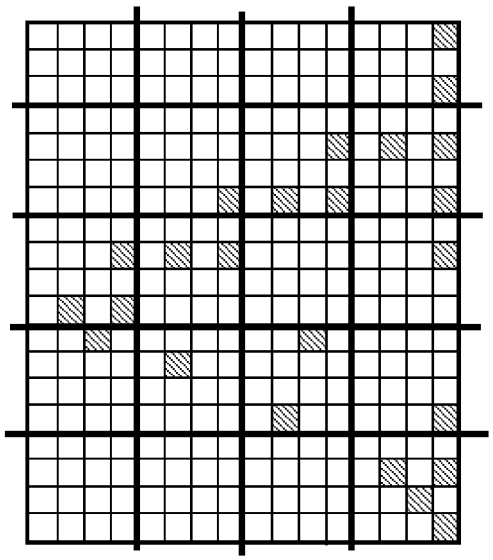
FIG. 7D illustrates an example of the halftoned source date according to the fill pattern for pixels at level 6, according to an embodiment of this invention.
Figure 7C:
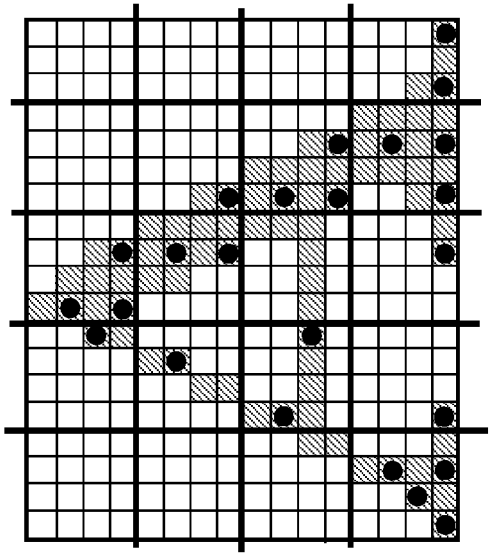
FIG. 7C illustrates an example of the scaled source date relative to the fill pattern for pixels at level 6, according to an embodiment of this invention.

FIG. 7A shows an example of a scaled source data at device resolution prior to rendering a color fill where its 8-bit gray level is at 32. FIG. 7B illustrates an example of an exemplary halftone pattern interpolated between two reference halftone patterns, according to an embodiment of this invention. The interpolation may be based on a rule that may include maximize high spatial frequency and may include random dispositions with an 8-by-8 matrix. FIG. 7C illustrates an example of the scaled source date relative to the fill pattern for pixels at level 6, according to an embodiment of this invention. FIG. 7D illustrates an example of the halftoned source date according to the fill pattern for pixels at level 6, according to an embodiment of this invention.

Figure 8B:
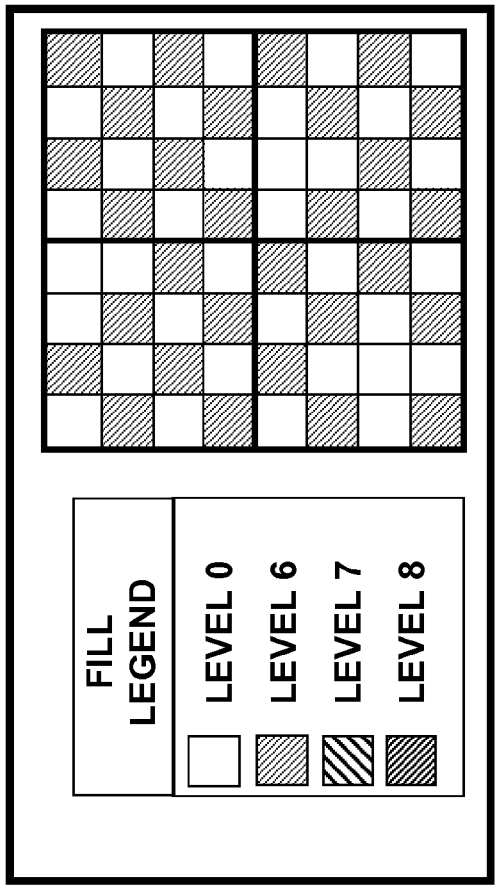
FIG. 8B illustrates an example of an exemplary halftone pattern interpolated between two reference halftone patterns, according to an embodiment of this invention and an exemplary fill legend.
Figure 8A:
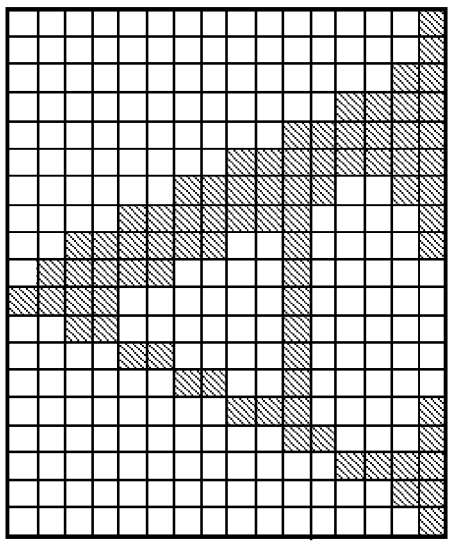
FIG. 8A shows an example of a scaled source data at device resolution prior to rendering a color fill where its 8-bit gray level is at 53.
Figure 8D:
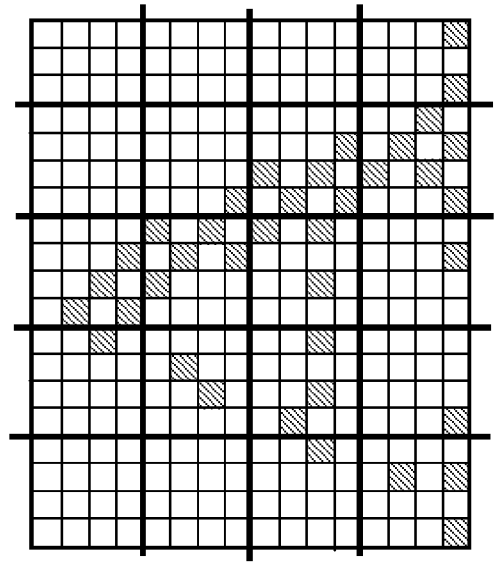
FIG. 8D illustrates an example of the halftoned source date according to the fill pattern for pixels at level 6, according to an embodiment of this invention.
Figure 8C:
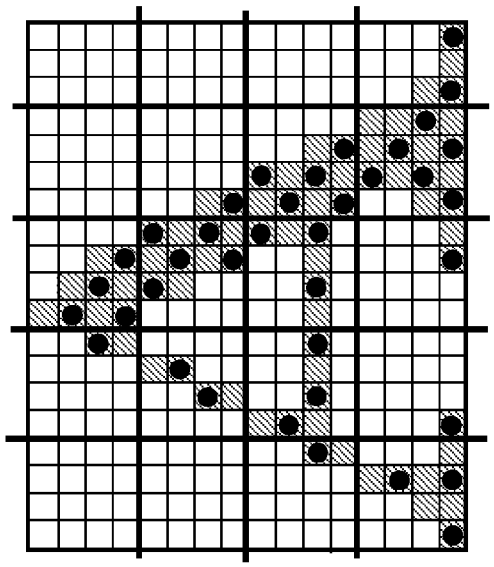
FIG. 8C illustrates an example of the scaled source date relative to the fill pattern for pixels at level 6, according to an embodiment of this invention.

FIG. 8A shows an example of a scaled source data at device resolution prior to rendering a color fill where its 8-bit gray level is at 53. FIG. 8B illustrates an example of an exemplary halftone pattern interpolated between two reference halftone patterns, according to an embodiment of this invention. FIG. 8C illustrates an example of the scaled source date relative to the fill pattern for pixels at level 6, according to an embodiment of this invention. FIG. 8D illustrates an example of the halftoned source date according to the fill pattern for pixels at level 6, according to an embodiment of this invention.

One of ordinary skill in the art will also appreciate that the modules and functions described herein may be further subdivided, combined, and/or varied and yet still be in the spirit of the embodiments of the invention. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A method of multilevel halftoning comprising:
  determining a gray level of an object to be rendered;
  selecting or generating a halftone cell comprising a pixel gray level setting for each of a plurality of pixels associated with the halftone cell, the selecting or generating being based on the determined gray level of the object and a first pixel gray level for a rendering device adapted to render a pixel at one of two or more levels of tone wherein:
    if the determined gray level of the object is equal to the first pixel gray level for a rendering device, then selecting or generating a first halftone cell for a gray level associated with the first pixel gray level for the rendering device wherein all pixels associated with the halftone cell have a tone level about the level of the first pixel gray level;
    if the determined gray level of the object is less than the first pixel gray level for a rendering device, then selecting or generating a second halftone cell for a gray level associated with less than the first pixel gray level for the rendering device wherein a plurality of pixels associated with the second halftone cell each have a tone level about the level of the first pixel gray level and the associated plurality of pixels are disposed with reference to the second halftone cell according to a first defined pattern wherein a quantity of the plurality of pixels in relation to all of the pixels associated with the second halftone cell is in proportion to the determined gray level of the object in relation to the first pixel gray level; and
    if the determined gray level of the object is greater than the first pixel gray level for a rendering device, then selecting or generating a third halftone cell for a gray level associated with a second pixel gray level that is greater than the first pixel gray level for the rendering device, wherein a first plurality of pixels associated with the third halftone cell each have a tone level at the level of the first pixel gray level and a second plurality of pixels associated with the third halftone cell each have a tone level of a second pixel gray level that is greater in value than the level of the first pixel gray level and the second plurality of pixels having a tone level at the second pixel gray level are disposed with reference to the third halftone cell according to a second defined pattern wherein a quantity of the second plurality of pixels having a tone level of about the second pixel gray level in relation the first plurality of pixels of the halftone cell having a tone level of about the first pixel gray level is based on a total quantity of pixels comprising the third halftone cell and is in proportion to the determined gray level of the object related to the second pixel gray level and the first pixel gray level; and
  halftoning the object with the selected or generated halftone cell.

2. The method of multilevel halftoning of claim 1 wherein the first pixel gray level is a minimal stable pixel gray level for the rendering device.

3. The method of multilevel halftoning of claim 1 wherein the first defined pattern is quantized at one-pixel increments of high spatial frequency disposition.

4. The method of multilevel halftoning of claim 1 wherein the first defined pattern is quantized at one-pixel increments of randomly generated disposition.

5. The method of multilevel halftoning of claim 1 wherein the second defined pattern is quantized at four-pixel increments of high spatial frequency disposition.

6. The method of multilevel halftoning of claim 1 wherein the second defined pattern is quantized at four-pixel increments of randomly generated disposition.

7. An image processor operative to halftone objects, the image processor comprising:
   a processing unit having addressable memory;
   a gray level determiner operative to determine a first gray level of a first object to be rendered and a second gray level of a second object to be rendered;
   a halftone cell selector operative to select a halftone cell based on a determined gray level, wherein the halftone cell selector is adapted to select from a halftone cell library comprising;
      a first halftone cell for a gray level associated with the first pixel gray level for the rendering device wherein all pixels associated with the halftone cell have a tone level about the level of the first pixel gray level;
      a second halftone cell for a gray level is associated with less than the first pixel gray level for the rendering device wherein a plurality of pixels associated with the second halftone cell each have a tone level about the level of the first pixel gray level and the associated plurality of pixels are disposed with reference to the second halftone cell according to a first defined pattern wherein a quantity of the plurality of pixels in relation to all of the pixels associated with the second halftone cell is in proportion to the determined gray level of the object in relation to the first pixel gray level; and
      a third halftone cell for a gray level is associated with a second pixel gray level that is greater than the first pixel gray level for the rendering device, wherein a first plurality of pixels associated with the third halftone cell each have a tone level at the level of the first pixel gray level and a second plurality of pixels associated with the third halftone cell each have a tone level of a second pixel gray level that is greater in value than the level of the first pixel gray level and the second plurality of pixels having a tone level at the second pixel gray level are disposed with reference to the third halftone cell according to a second defined pattern wherein a quantity of the second plurality of pixels having a tone level of about the second pixel gray level in relation the first plurality of pixels of the halftone cell having a tone level of about the first pixel gray level is based on a total quantity of pixels comprising the third halftone cell and is in proportion to the determined gray level of the object related to the second pixel gray level and the first pixel gray level; and
   a halftoner operative to generate a halftoned version of the object to be rendered.

8. The image processor of claim 7 wherein the first pixel gray level is a minimal stable pixel gray level for the rendering device.

9. The image processor of claim 7 wherein the first defined pattern is quantized at one-pixel increments of high spatial frequency disposition.

10. The image processor of claim 7 wherein the first defined pattern is quantized at one-pixel increments of randomly generated disposition.

11. The image processor of claim 7 wherein the second defined pattern is quantized at four-pixel increments of high spatial frequency disposition.

12. The image processor of claim 7 wherein the second defined pattern is quantized at four-pixel increments of randomly generated disposition.

13. An image processor operative to halftone objects, the image processor comprising:
   a processing unit having addressable memory;
   a gray level determiner operative to determine a first gray level of a first object to be rendered and a second gray level of a second object to be rendered;
   a halftone cell generator operative to select from a library or generate a halftone cell based on a determined gray level, wherein:
      if the determined gray level of the object is equal to the first pixel gray level for a rendering device, then the halftone cell generator selects or generates a first halftone cell for a gray level associated with the first pixel gray level for the rendering device wherein all pixels associated with the halftone cell have a tone level about the level of the first pixel gray level;
      if the determined gray level of the object is less than the first pixel gray level for a rendering device, then the halftone cell generator selects or generates a second halftone cell for a gray level associated with less than the first pixel gray level for the rendering device wherein a plurality of pixels associated with the second halftone cell each have a tone level about the level of the first pixel gray level and the associated plurality of pixels are disposed with reference to the second halftone cell according to a first defined pattern wherein a quantity of the plurality of pixels in relation to all of the pixels associated with the second halftone cell is in proportion to the determined gray level of the object in relation to the first pixel gray level; and
      if the determined gray level of the object is greater than the first pixel gray level for a rendering device, then the halftone cell generator selects or generates a third halftone cell for a gray level associated with a second pixel gray level that is greater than the first pixel gray level for the rendering device, wherein a first plurality of pixels associated with the third halftone cell each have a tone level at the level of the first pixel gray level and a second plurality of pixels associated with the third halftone cell each have a tone level of a second pixel gray level that is greater in value than the level of the first pixel gray level and the second plurality of pixels having a tone level at the second pixel gray level are disposed with reference to the third halftone cell according to a second defined pattern wherein a quantity of the second plurality of pixels having a tone level of about the second pixel gray level in relation to the first plurality of pixels of the halftone cell having a tone level of about the first pixel gray level is based on a total quantity of pixels comprising the third halftone cell and is in proportion to the determined gray level of the object related to the second pixel gray level and the first pixel gray level; and
   a halftoner operative to generate a halftoned version of the object to be rendered.

14. The image processor of claim 13 wherein the first pixel gray level is a minimal stable pixel gray level for the rendering device.

15. The image processor of claim 13 wherein the first defined pattern is quantized at one-pixel increments of high spatial frequency disposition.

16. The image processor of claim 13 wherein the first defined pattern is quantized at one-pixel increments of randomly generated disposition.

17. The image processor of claim 13 wherein the second defined pattern is quantized at four-pixel increments of high spatial frequency disposition.

18. The image processor of claim 13 wherein the second defined pattern is quantized at four-pixel increments of randomly generated disposition.

19. A method of multilevel halftoning comprising:
determining a gray level of an object to be rendered;
generating a halftone cell comprising a pixel gray level setting for each of a plurality of pixels associated with the halftone cell, the generating being based on the determined gray level of the object and a minimal stable pixel gray level for the rendering device adapted to render a pixel at one of two or more levels of tone;
generating a halftone cell for a gray level associated with less than the minimal stable pixel gray level for the rendering device wherein a plurality of pixels associated with the halftone cell each have a tone level about the level of the minimal stable pixel gray level and the associated plurality of pixels are disposed with reference to the halftone cell according to a pattern of high spatial frequency; and
halftoning the object with the selected or generated halftone cell.

20. A method of multilevel halftoning comprising:
selecting or generating, by a processing unit having addressable memory, a halftone cell comprising a pixel gray level setting for each of a plurality of pixels associated with the halftone cell wherein:
  if a gray level of an object is less than a first pixel gray level for a rendering device, then selecting or generating a second halftone cell for a gray level associated with less than the first pixel gray level for the rendering device wherein a plurality of pixels associated with the second halftone cell each have a tone level about the level of the first pixel gray level and the associated plurality of pixels are disposed with reference to the second halftone cell according to a first defined pattern wherein a quantity of the plurality of pixels in relation to all of the pixels associated with the second halftone cell is in proportion to the gray level of the object in relation to the first pixel gray level; and
  if the gray level of the object is greater than the first pixel gray level for a rendering device, then selecting or generating a third halftone cell for a gray level associated with a second pixel gray level that is greater than the first pixel gray level for the rendering device, wherein a first plurality of pixels associated with the third halftone cell each have a tone level at the level of the first pixel gray level and a second plurality of pixels associated with the third halftone cell each have a tone level of a second pixel gray level that is greater in value than the level of the first pixel gray level and the second plurality of pixels having a tone level at the second pixel gray level are disposed with reference to the third halftone cell according to a second defined pattern wherein a quantity of the second plurality of pixels having a tone level of about the second pixel gray level in relation to the first plurality of pixels of the halftone cell having a tone level of about the first pixel gray level is based on a total quantity of pixels comprising the third halftone cell and is in proportion to the gray level of the object related to the second pixel gray level and the first pixel gray level.

* * * * *